(12) United States Patent
Kote et al.

(10) Patent No.: US 12,095,620 B1
(45) Date of Patent: Sep. 17, 2024

(54) TELECOMMUNICATIONS INFRASTRUCTURE DEVICE MANAGEMENT USING MACHINE LEARNING

(71) Applicant: Dell Products L.P., Round Rock, TX (US)

(72) Inventors: Nithish Kote, Bangalore (IN); Parminder Singh Sethi, Ludhiana (IN); Vinay Kumar Lokeshappa Malligere, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/242,219

(22) Filed: Sep. 5, 2023

(51) Int. Cl.
*H04L 41/084* (2022.01)
*G06F 11/07* (2006.01)
*H04L 41/0631* (2022.01)
*H04L 41/0659* (2022.01)
*H04L 41/0816* (2022.01)

(52) U.S. Cl.
CPC ...... *H04L 41/0843* (2013.01); *G06F 11/0793* (2013.01); *H04L 41/0631* (2013.01); *H04L 41/0661* (2023.05); *H04L 41/0816* (2013.01)

(58) Field of Classification Search
CPC ............. H04L 41/0843; H04L 41/0661; H04L 41/0631; H04L 41/0816; G06F 11/0793
See application file for complete search history.

(56) References Cited

U.S. PATENT DOCUMENTS

| | | | | |
|---|---|---|---|---|
| 9,189,257 | B2* | 11/2015 | Colyer | G06F 9/44505 |
| 9,317,706 | B2* | 4/2016 | Kaushik | G06F 16/951 |
| 9,762,438 | B2* | 9/2017 | Anerousis | H04L 41/08 |
| 10,445,122 | B2* | 10/2019 | Kotha | G06F 9/45558 |
| 11,438,800 | B2* | 9/2022 | Kozat | H04L 41/5006 |
| 11,451,984 | B2* | 9/2022 | Tsai | H04L 41/0896 |
| 2012/0166488 | A1* | 6/2012 | Kaushik | G06F 21/6209 |
| | | | | 707/795 |

(Continued)

OTHER PUBLICATIONS

Gosselin et al.,, "Application of probabilistic modeling and machine learning to the diagnosis of FTTH GPON networks", International Conference on Optical Network Design and Modeling (ONDM), May 15, 2017.*

(Continued)

*Primary Examiner* — Todd L Barker
(74) *Attorney, Agent, or Firm* — Ryan, Mason & Lewis, LLP

(57) ABSTRACT

A method comprises receiving telecommunications infrastructure data corresponding to a plurality of devices, determining at least one issue with at least one device of the devices based at least in part on the telecommunications infrastructure data, and identifying at least one remedial action to be performed to address the at least one issue. The identifying is performed using one or more machine learning techniques and the at least one remedial action comprises at least one of adding at least one additional device to the plurality of devices and reconfiguring the at least one device. One or more configuration templates are retrieved and inputted to at least one of the at least one additional device and the at least one device based at least in part on the at least one remedial action. A report including the at least one issue and the at least one remedial action is generated.

20 Claims, 16 Drawing Sheets

(56) References Cited

U.S. PATENT DOCUMENTS

| | | | | |
|---|---|---|---|---|
| 2017/0171024 | A1* | 6/2017 | Anerousis | H04L 41/0883 |
| 2017/0228246 | A1* | 8/2017 | Kotha | G06F 9/45558 |
| 2017/0250855 | A1* | 8/2017 | Patil | H04L 47/827 |
| 2018/0205793 | A1* | 7/2018 | Loeb | G06T 19/003 |
| 2019/0303726 | A1* | 10/2019 | Côté | H04L 41/16 |
| 2020/0196194 | A1* | 6/2020 | Kozat | H04L 41/0806 |
| 2022/0012112 | A1* | 1/2022 | Wouhaybi | G06F 11/3447 |
| 2022/0035541 | A1* | 2/2022 | Genereux | G06F 3/067 |
| 2022/0150723 | A1* | 5/2022 | Tsai | H04W 28/08 |
| 2022/0405106 | A1* | 12/2022 | Mandramoorthy | H04L 61/5014 |
| 2023/0164049 | A1* | 5/2023 | Samadi | H04L 41/147 370/335 |

OTHER PUBLICATIONS

McClellan et al., "Deep Learning at the Mobile Edge: Opportunities for 5G Networks", Jul. 9, 2020.*

Tandiya et al., "Deep Predictive Coding Neural Network for RF Anomaly Detection in Wireless Networks", IEEE International Conference on Communication Workshops, May 20, 2018, IEEE Publishing.*

Friesen et al, "Machine Learning for Zero Touch-Management in Heterogeneous Industrial Networks—A Review", IEEE 18th International Conference on Factory Communication Systems, Apr. 27, 2022, IEEE Publishing.*

Kumar et al, "Macine Learning: The Panacea for 5G Complexities", Journal of ICT, pp. 157-170, Mar. 5, 2019.*

Radosevic et al.,"Source Code Generator Based on Dynamic Frames", Journal of Information and Organizatinal Sciences (JIOS), vol. 35, No. 1, Dec. 2011.*

Baseband Unit (BBU), BBU Emulation for Field, Lab, and Manufacturing; https://www.viavisolutions.com/en-us; 6 pages.

Faisal, "C-RAN vs Cloud RAN vs vRAN vs O-RAN vstraditional RAN-Guide!," Astra WordPress Theme, Apr. 17, 2021, 61 pages.

Wikipedia, "Intelligent Platform ManagementInterface," https://en.wikipedia.org/w/index.php?title=Intelligent_Platform_Management_Interface&oldid=1160860042#Baseboard_management_controller, 7 pages.

U.S. Appl. No. 18/118,530 filed in the name of Parminder Singh Sethi et al. on Mar. 7, 2023, and entitled "Device Priority Prediction Using Machine Learning.".

* cited by examiner

801

```
import warnings
import itertools
import pandas as pd
import numpy as np
import matplotlib.pyplot as plt
import statsmodels.api as sm data = pd.read_csv('server_utilization.csv', engine='python', skipfooter=3)
data['Month']=pd.to_datetime(data['Month'], format='%Y-%m-%d')
data.set_index(['Month'], inplace=True)

# Plot the data
data.plot()
plt.ylabel('Monthly server utilization (x1000)')
plt.xlabel('Date')
plt.show()

q = d = range(0, 2)
p = range(0, 4)

pdq = list(itertools.product(p, d, q))

seasonal_pdq = [(x[0], x[1], x[2], 12) for x in list(itertools.product(p, d, q))]

train_data = data['2009-01-01':'2019-12-01']
test_data = data['2020-01-01':'2020-12-01']

warnings.filterwarnings("ignore")
```

```
AIC = []
SARIMAX_model = []
for param in pdq:
    for param_seasonal in seasonal_pdq:
        try:
            mod = sm.tsa.statespace.SARIMAX(train_data,
                                 order=param,
                                 seasonal_order=param_seasonal,
                                 enforce_stationarity=False,
                                 enforce_invertibility=False)

results = mod.fit()

print('SARIMAX{}x{} - AIC:{}'.format(param, param_seasonal, results.aic), end='\r')
            AIC.append(results.aic)
            SARIMAX_model.append([param, param_seasonal])
        except:
            continue print('The smallest AIC is {} for model SARIMAX{}x{}'.format(min(AIC),
SARIMAX_model[AIC.index(min(AIC))][0],SARIMAX_model[AIC.index(min(AIC))][1]))

mod = sm.tsa.statespace.SARIMAX(train_data,
                    order=SARIMAX_model[AIC.index(min(AIC))][0],
                    seasonal_order=SARIMAX_model[AIC.index(min(AIC))][1],
                    enforce_stationarity=False,
                    enforce_invertibility=False)

results = mod.fit()

results.plot_diagnostics(figsize=(20, 14))
plt.show()
```

```
pred0 = results.get_prediction(start='2018-01-01', dynamic=False)
pred0_ci = pred0.conf_int()

pred1 = results.get_prediction(start='2018-01-01', dynamic=True)
pred1_ci = pred1.conf_int()

pred2 = results.get_forecast('2021-12-01')
pred2_ci = pred2.conf_int()
print(pred2.predicted_mean['2020-01-01':'2020-12-01'])

ax = data.plot(figsize=(9,4))
pred0.predicted_mean.plot(ax=ax, label='1-step-ahead Forecast (get_predictions, dynamic=False)')
pred1.predicted_mean.plot(ax=ax, label='Dynamic Forecast (get_predictions, dynamic=True)')
pred2.predicted_mean.plot(ax=ax, label='Dynamic Forecast (get_forecast)')
ax.fill_between(pred2_ci.index, pred2_ci.iloc[:, 0], pred2_ci.iloc[:, 1], color='k', alpha=.1)
plt.ylabel('server utilization (x1000)')
plt.xlabel('Date')
plt.legend()
plt.show()

prediction = pred2.predicted_mean['2020-01-01':'2020-12-01'].values
print(prediction)

truth = list(itertools.chain.from_iterable(test_data.values))
print(truth)
```

```
import pandas
from sklearn.ensemble import RandomForestRegressor
from sklearn import model_selection
from sklearn.metrics import accuracy_score
from sklearn.preprocessing import LabelEncoder load data
data = pandas.read_csv('server_utilization.csv', header=None)
dataset = data.values
print(dataset)

# split data into X and y
X = dataset[:,0:5]
Y = dataset[:,5]

# encode string class values as integers
label_encoder = LabelEncoder()
label_encoder = label_encoder.fit(Y)
label_encoded_y = label_encoder.transform(Y)

seed = 7
test_size = 0.33
X_train, X_test, y_train, y_test = model_selection.train_test_split(X, label_encoded_y,
                        test_size=test_size, random_state=seed)

regr = RandomForestRegressor(max_depth=2, random_state=0)
regr.fit(X_train, y_train)

# make predictions for test data
y_pred = regr.predict(X_test)
predictions = [round(value) for value in y_pred]

# evaluate predictions
accuracy = accuracy_score(y_test, predictions)
print("Accuracy: %.2f%%" % (accuracy * 100.0))
```

```
import pandas
from sklearn.ensemble import RandomForestRegressor
from sklearn import model_selection
from sklearn.metrics import accuracy_score
from sklearn.preprocessing import LabelEncoder load data
data = pandas.read_csv('server_utilization.csv', header=None)
dataset = data.values
print(dataset)

# split data into X and y
X = dataset[:,0:5]
Y = dataset[:,5]

# encode string class values as integers
label_encoder = LabelEncoder()
label_encoder = label_encoder.fit(Y)
label_encoded_y = label_encoder.transform(Y)

seed = 7
test_size = 0.33
X_train, X_test, y_train, y_test = model_selection.train_test_split(X, label_encoded_y,
                                    test_size=test_size, random_state=seed)

regr = RandomForestRegressor(max_depth=2, random_state=0)
regr.fit(X_train, y_train)

# make predictions for test data
y_pred = regr.predict(X_test)
predictions = [round(value) for value in y_pred]

# evaluate predictions
accuracy = accuracy_score(y_test, predictions)
print("Accuracy: %.2f%%" % (accuracy * 100.0))
```

FIG. 9

TELECOMMUNICATIONS INFRASTRUCTURE DEVICE MANAGEMENT USING MACHINE LEARNING

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing systems, and more particularly to management of telecommunications infrastructure devices.

BACKGROUND

Telecommunications stations (e.g., multi-cloud telecommunications stations) include various devices such as, for example, network switches and servers. In an area where there is a high concentration of telecommunications network users, such telecommunications stations can put high stress on the components that serve the telecommunications stations. In an effort to alleviate this stress, several servers may be connected to form a pool in a network. Current approaches are not able to identify circumstances under which additional servers should be added to a pool and/or which servers may be experiencing issues and require replacement or reconfiguration.

SUMMARY

Illustrative embodiments provide techniques for automated management of telecommunications infrastructure devices when addressing device issues and/or failures.

In one embodiment, a method comprises receiving telecommunications infrastructure data corresponding to a plurality of devices, determining at least one issue with at least one device of the plurality of devices based at least in part on the telecommunications infrastructure data, and identifying at least one remedial action to be performed to address the at least one issue. The identifying is performed using one or more machine learning techniques and the at least one remedial action comprises at least one of adding at least one additional device to the plurality of devices and reconfiguring the at least one device. One or more configuration templates are retrieved and inputted to at least one of the at least one additional device and the at least one device based at least in part on the at least one remedial action. A report including the at least one issue and the at least one remedial action is generated.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

These and other features and advantages of embodiments described herein will become more apparent from the accompanying drawings and the following detailed description.

BRIEF DESCRIPTION OF THE DRAWINGS

FIGS. 8A, 8B, 8C and 8D depict example pseudocode for using an autoregressive integrated moving average (ARIMA) time series machine learning model to forecast telecommunications data at regular time intervals and describe autocorrelations in the telecommunications data, according to an illustrative embodiment.

FIG. 9 depicts example pseudocode for using a Random Forest machine learning algorithm to analyze forecasted and real-time data, according to an illustrative embodiment.

DETAILED DESCRIPTION

Figure 1:
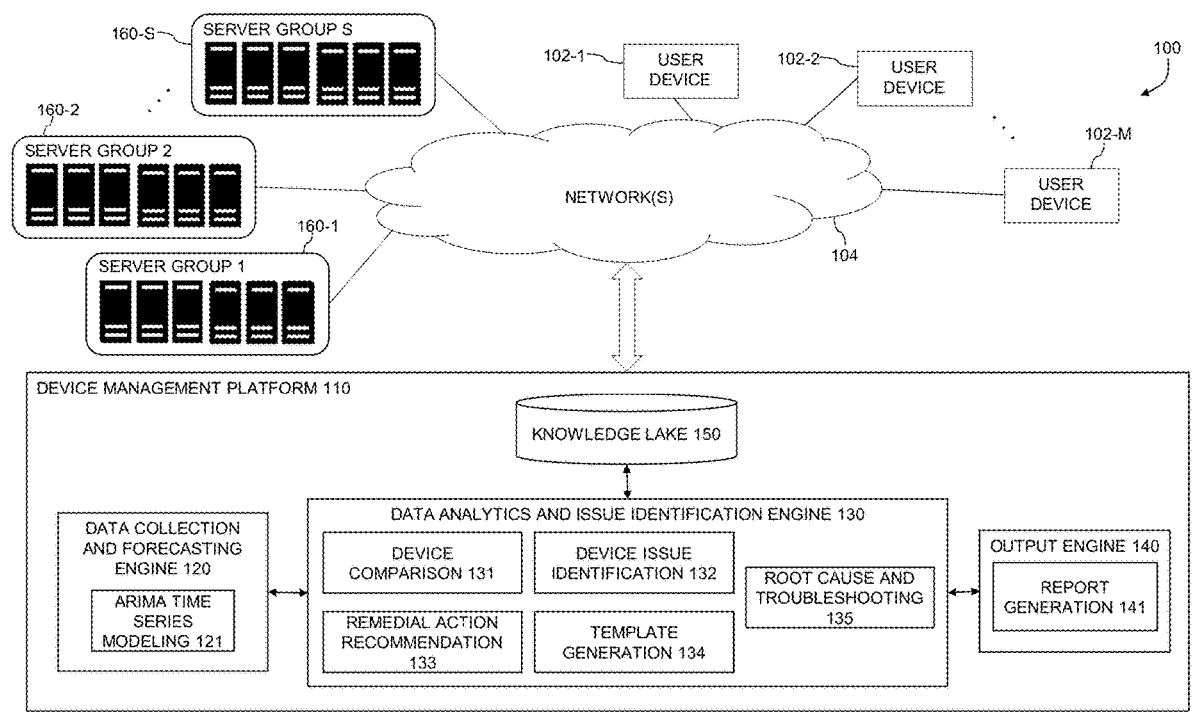
FIG. 1 depicts details of an information processing system with a device management platform for managing telecommunications infrastructure devices when addressing device issues and/or failures, according to an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which an embodiment is implemented, other appropriate timescales that provide at least contemporaneous performance and output can be achieved.

As used herein, a "computing device" refers to a device configured to provide functionality (e.g., applications, tasks, workloads and services) for programs or other devices. A non-limiting example of a computing device is a server. Computing devices provide various functionalities for clients or users, including, but not necessarily limited to, cataloging network data, processing network traffic, signal processing, storing data, implementing communications, performing computations, sharing files, providing streaming services and providing virtualization services.

In illustrative embodiments, machine learning techniques are used to intelligently manage a plurality of computing devices (also referred to herein as "devices") in various situations such as for example, when one or more of the plurality of devices are experiencing operational issues, failure or other critical states where the one or more devices may fail to function or their ability to function may be impeded. The embodiments provide an automated framework for dynamically analyzing telecommunications infrastructures and recommending and/or implementing corrective actions based on real-time infrastructure metrics. Advantageously, the illustrative embodiments provide techniques for identifying issues with baseband processing unit (BBU) server performance and alerting telecommunications administrators with recommended remedial actions and comprehensive insight into the root cause of the issues. As an additional advantage, the embodiments use one or more machine learning techniques to proactively predict hardware failures and suggest remedial measures to enable rapid troubleshooting of identified problems, thereby reducing system downtime.

FIG. 1 shows an information processing system 100 configured in accordance with an illustrative embodiment. The information processing system 100 comprises user devices 102-1, 102-2, ... 102-M (collectively "user devices 102"). The user devices 102 communicate over a network 104 with a device management platform 110.

The user devices 102 can comprise, for example, Internet of Things (IOT) devices, desktop, laptop or tablet computers, mobile telephones, or other types of processing devices capable of communicating with the device management platform 110 over the network 104. Such devices are examples of what are more generally referred to herein as "processing devices." Some of these processing devices are also generally referred to herein as "computers." The user devices 102 may also or alternately comprise virtualized computing resources, such as virtual machines (VMs), containers, etc. The user devices 102 in some embodiments comprise respective computers associated with a particular company, organization or other enterprise. The variable M and other similar index variables herein such as K, L, N, P and S are assumed to be arbitrary positive integers greater than or equal to one.

The terms "client" or "user" herein are intended to be broadly construed so as to encompass numerous arrangements of human, hardware, software or firmware entities, as well as combinations of such entities. Device management services may be provided for users utilizing one or more machine learning models, although it is to be appreciated that other types of infrastructure arrangements could be used. At least a portion of the available services and functionalities provided by the device management platform 110 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the device management platform 110, as well as to support communication between the device management platform 110 and connected devices (e.g., user devices 102) and/or other related systems and devices not explicitly shown.

In some embodiments, the user devices 102 are assumed to be associated with repair technicians, system administrators, information technology (IT) managers, software developers release management personnel or other authorized personnel configured to access and utilize the device management platform 110.

The information processing system 100 further includes server groups 160-1, 160-2, ..., 160-S (collectively "server groups 160") connected to the device management platform 110 and/or to each other via the network 104 or other type of connection such as, for example, a wired connection. Although the embodiments are explained in terms of server groups 160, and more specifically, BBU server groups or pools, the embodiments are not necessarily limited thereto, and may apply to other types of devices such as, but not necessarily limited to, controllers, switches, etc.

The device management platform 110 in the present embodiment is assumed to be accessible to the user devices 102 and vice versa over the network 104. In addition, the device management platform 110 can access the server groups 160 and vice versa over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The device management platform 110, on behalf of respective infrastructure tenants each corresponding to one or more users associated with respective ones of the user devices 102 provides a platform for automating the management of devices (e.g., servers in the server groups 160) when addressing device issues and/or failures.

Referring to FIG. 1, the device management platform 110 comprises a data collection and forecasting engine 120, a data analytics and issue identification engine 130, an output engine 140 and a knowledge lake 150. The data analytics and issue identification engine 130 comprises a device comparison layer 131, a device issue identification layer 132, a remedial action recommendation layer 133, a template generation layer 134 and a root cause and troubleshooting layer 135. The output engine 140 comprises a report generation layer 141.

The data collection and forecasting engine 120 collects telecommunications infrastructure data including data corresponding to the operation, performance and/or configuration of servers in the server groups 160. As noted herein above, the server groups 160 may comprise pools of BBU servers. As used herein, a "baseband processing unit" or BBU refers to, for example, a device of a telecommunications network that processes baseband signals. As described in more detail herein, a radio access network (RAN) includes a BBU connected to one or more remote radio units (RRUs) (also referred to herein as remote radio heads (RRHs)). The RRUs (or RRHs) are adjacent to antenna(s). A BBU may communicate with a core network through a physical interface, and an RRU performs transmit and receive radio frequency (RF) functions.

Figure 2:
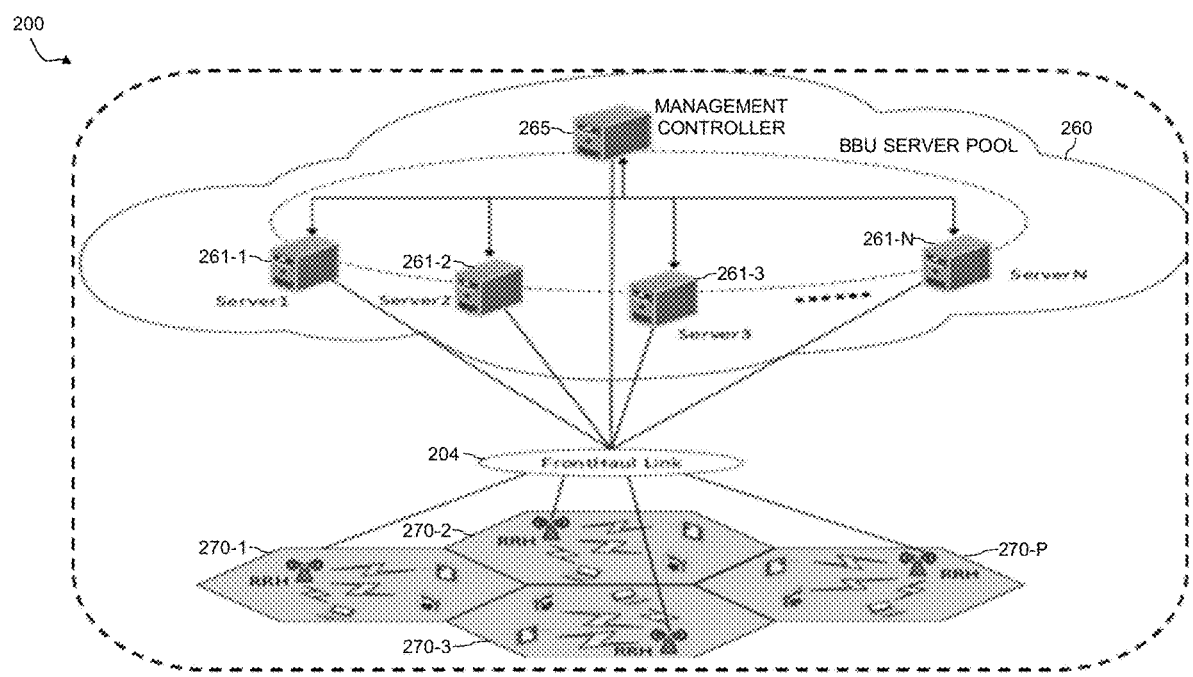
FIG. 2 depicts a cloud radio access network (C-RAN) network, according to an illustrative embodiment.

FIG. 2 illustrates an example of a C-RAN network 200 comprising a BBU server pool 260 (which may be the same or similar to one of the server groups 160) including a plurality of servers 261-1, 261-2, 261-3, ... 261-N (collectively "servers 261"), which can respectively function as a BBU. The servers 261 are controlled by a management controller 265 and are connected to a plurality of RRHs 270-1, 270-2, 270-3, 270-P (collectively "RRHs 270) through a fronthaul link 204. A cloud radio access network (C-RAN) network includes a BBU, one or more RRHs (or RRUs), and fronthaul link, which is a transport network. Fronthaul link 204 as shown in FIG. 2 is a connection layer between a BBU server pool 260 and a set of RRHs 270. The fronthaul link 204 provides high-bandwidth links to handle the requirements of multiple RRHs.

In the area where network user concentration is high, such high stress is placed on BBUs that serve the users. As a result, several servers may be connected to form a BBU server pool (e.g., BBU server pool 260) in a C-RAN. Servers 261 in the BBU server pool 260 have high computational power and storage capabilities. A BBU is located at a designated radius based on, for example, user population, usage requirements and geography. Each BBU is placed across a certain radius/kilometer which is part of the CRAN. As population, usage and/or geography changes, additional BBUs and/or BBU servers may be needed.

Referring to back to FIG. 1, the telecommunications infrastructure data collected by the data collection and forecasting engine 120 comprises, for example, vendor information for at least one telecommunications network (e.g., identifying information for a telecommunications network vendor such as a name of the vendor), a number of users of the telecommunications network, a service radius of the telecommunications network, BBU identifiers (e.g., unique identifiers, names, etc.), one or more protocols of the telecommunications network, one or more types of the telecommunications network (e.g., C-RAN, virtual radio access network (V-RAN), open radio access network (O-RAN)), operating system (OS) information for the devices (e.g., file system host OS for the servers in the server groups 160 or servers 261), and disk information for the devices (e.g., universally unique identifiers (UUIDs) for disks of the servers in the server groups 160 or servers 261). The telecommunications infrastructure data further comprises one or more performance parameters of the devices, such as, for example, throughput, bandwidth, input-output operations per second (IOPs), latency and processing speed.

The data collection and forecasting engine 120 collects the data, for example, through scheduled collections at designated times and/or through event-based collections. Scheduled collections may occur at pre-defined times or intervals specified by, for example, an administrative user via one or more user devices 102 or automatically scheduled by the data collection and forecasting engine 120. Event-based collections are triggered by one or more events such as, but necessarily limited to, component failure, a detected degradation of performance of a component, installation of new software or firmware, the occurrence of certain operations, etc. In some embodiments, an integrated Della remote access controller (iDRAC) causes the data collection and forecasting engine 120 to collect data from one or more servers in the server groups 160 and export the collected data to a location such as a centralized database on the device management platform 110.

Figure 4:
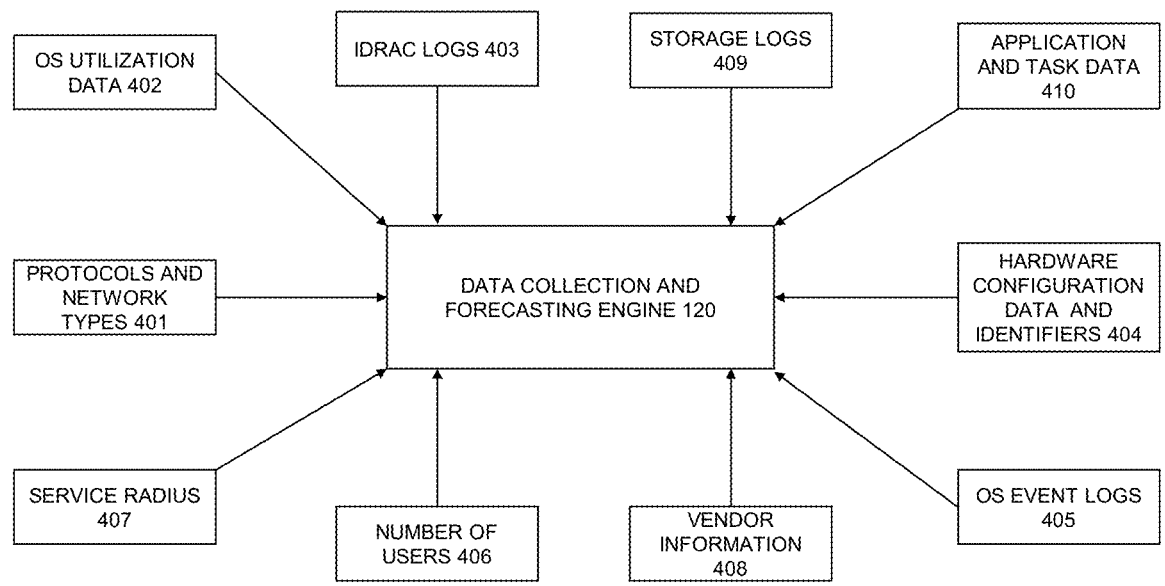
FIG. 4 depicts different types of data collected by a data collection and forecasting engine, according to an illustrative embodiment.

Referring to FIG. 4, the data collected by the data collection and forecasting engine 120 includes, but is not necessarily limited to, protocols and network types 401, OS utilization data 402, device iDRAC logs 403, hardware configuration data and identifiers 404, OS event logs 405, the number of network users 406, service radius data 407, vendor information 408, storage logs 409 and application and task data 410. The application and task data 410 includes, for example, an identification of which applications are installed on respective ones of the servers of the server group 160, and/or an identification of which of the applications, tasks or workloads are running on the respective ones of the servers of the server group 160.

For example, application and task data 410 comprises data corresponding to installed applications on a server or other processing device, including data identifying all of the services and tasks which are running in the system components and data identifying created datasets in the system components. According to an embodiment, applications are identified based on task.

In illustrative embodiments, in addition to the application and task data 410, the data collected by the data collection and forecasting engine 120 includes performance data comprising, for example, utilization data (e.g., OS utilization data 402), log data (e.g., from logs 403, 405 and 409), telecommunications network details (e.g., protocols and network types 401, number of network users 406, service radius data 407 and vendor information 408) and device configuration data (e.g., hardware configuration data and identifiers 404). The utilization data comprises, for example, central processing unit (CPU) utilization, memory utilization, network utilization and storage utilization of the servers of the server group 160. In more detail, the utilization data includes, but it is not necessarily limited to, hardware capacity and availability data comprising, for example, memory usage and available free memory of system hardware components.

Utilization data may identify incoming and outgoing input-output (IO) operation network or CPU processing traffic that a system and/or individual devices such as, for example, servers are handling.

Figure 5:
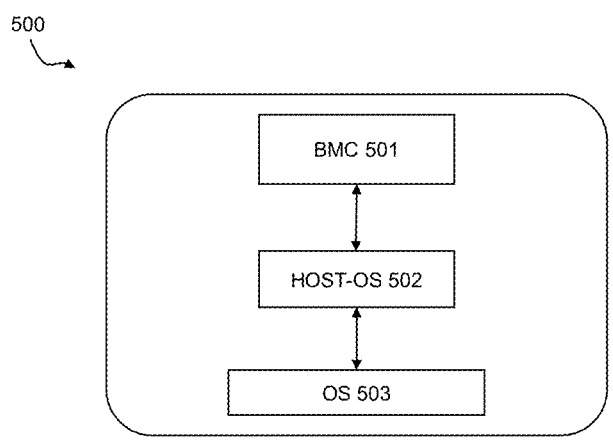
FIG. 5 depicts a block diagram of an operating system (OS) passthrough channel, according to an illustrative embodiment.

Referring to the block diagram 500 in FIG. 5, in one or more embodiments, the data collected by the data collection and forecasting engine 120 is collected at the baseboard management controller (BMC) level using an OS passthrough channel (e.g., host-OS 502) between a BMC 501 and OS 503 to share OS information and logs with the BMC 501. As noted herein above, the data can be collected and monitored periodically for decision making, and server statistics are maintained in each BBU locally across a C-RAN environment. The data is collected from each server using the passthrough channel.

In some embodiments, device configuration data is received from a remote-access controller (e.g., iDRAC) in a server configuration profile (SCP) file. SCP files are exported from one or more iDRACs, which include device information. In one or more embodiments, the data collection and forecasting engine 120 comprises a centralized log collector (CLC), which collects and stores the SCP files and logs from one or more iDRACs.

In one or more embodiments, the data collected by the data collection and forecasting engine 120 is collected using, for example, an autoregressive integrated moving average (ARIMA) time series machine learning model to maintain real-time results. The ARIMA time series machine learning model is used to forecast the data at regular time intervals and to describe the autocorrelations in the data to analyze the performance of servers in the server groups 160 (or servers 261) at regular periods. For example, referring back to FIG. 1, an ARIMA time series modeling layer 121 of the data collection and forecasting engine 120 executes the ARIMA time series machine learning model to determine real-time performance states of respective ones of the servers in one or more of the server groups 160.

Figure 6:
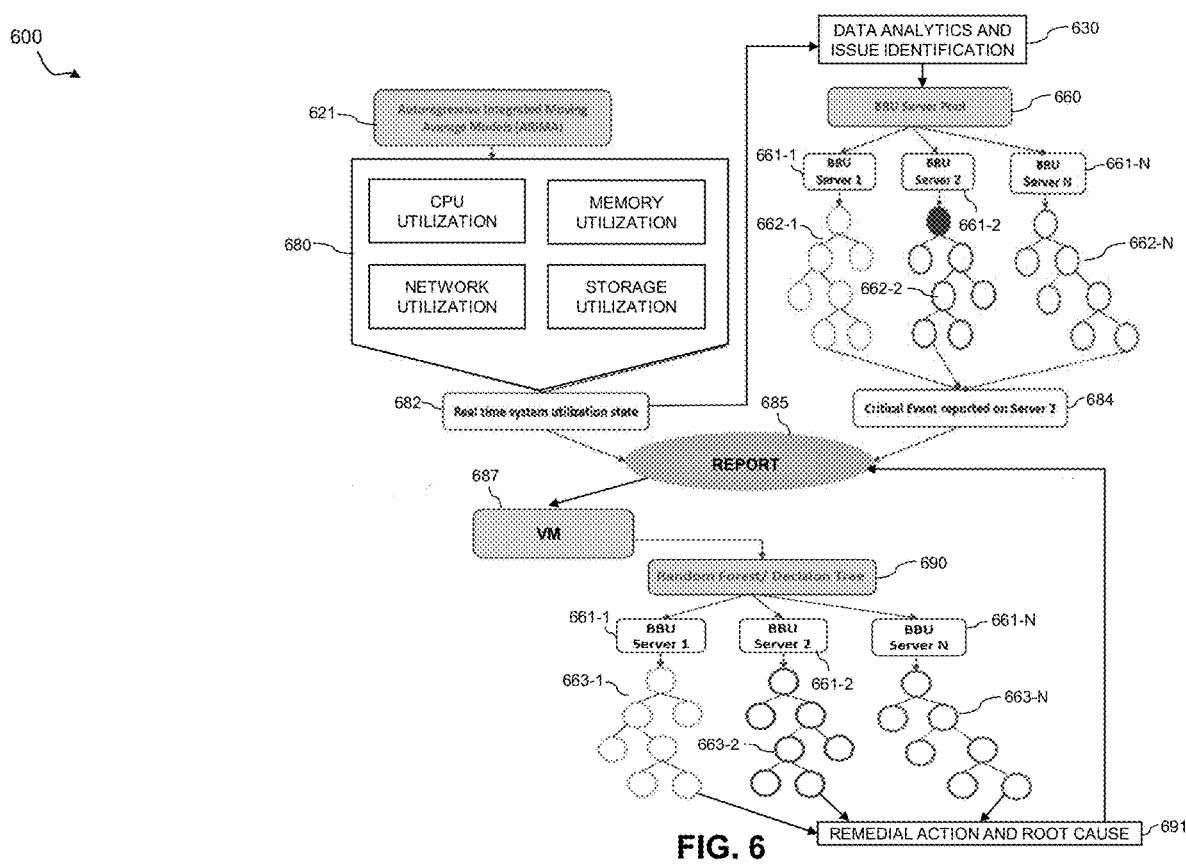
FIG. 6 depicts details of machine learning algorithms for forecasting real-time data, identifying device issues and recommending corrective actions, according to an illustrative embodiment.

In more detail, referring to the operational flow 600 in FIG. 6, data from the data collection and forecasting engine 120 including, for example, real-time utilization data 680 of the servers, is applied to one or more time series machine learning models, such as, for example, ARIMA models 621, to yield real-time system utilization states 682 of the hardware components of the servers. The real-time utilization data 680 comprises, for example, CPU utilization, memory utilization, network utilization and storage utilization of the hardware components. In some embodiments, the data collection and forecasting engine 120 continuously monitors and collects server utilization data such as, for example, CPU, memory, network, storage and power utilization, which is applied to a time series machine learning model, such as the ARIMA time series machine learning model, to analyze the data to generate the real-time system utilization states 682. FIGS. 8A, 8B, 8C and 8D depict example pseudocode 801, 802, 803 and 804 for using an ARIMA time series machine learning model to forecast telecommunications data at regular time intervals and describe autocorrelations in the telecommunications data. The real-time system utilization states 682 are input to the data analytics and issue identification engine 630 (which is the same or similar to the data analytics and issue identification engine 130) for further analysis as explained in more detail herein to identify one or more server issues (e.g., critical server events) and one or more remedial actions.

Figure 3:
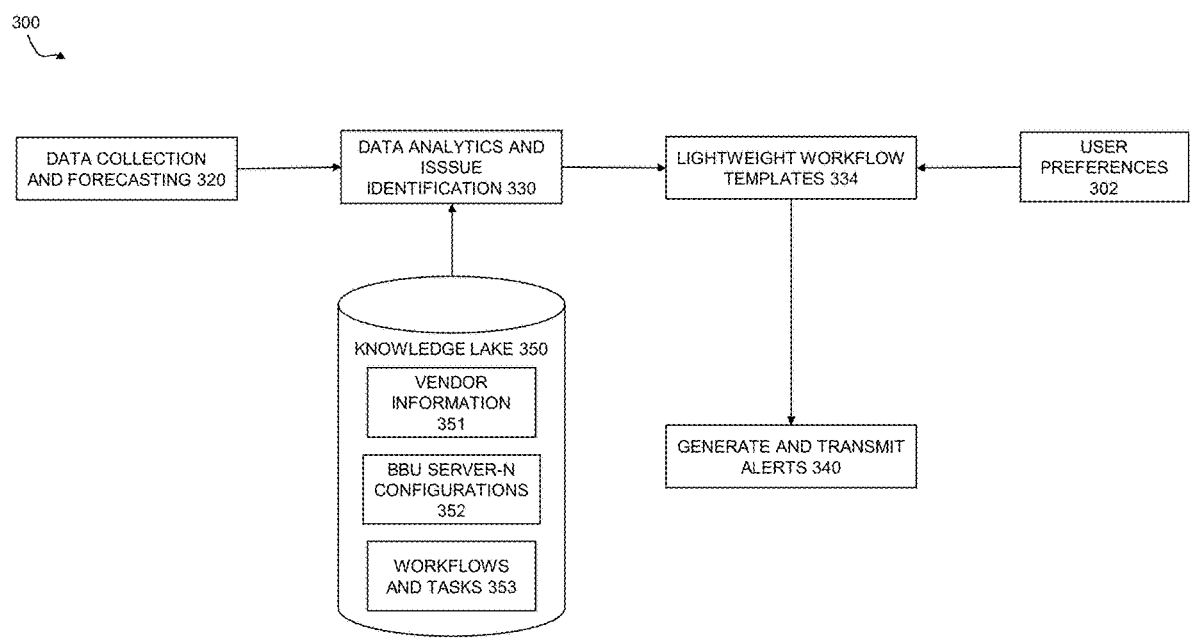
FIG. 3 depicts an operational flow for device management, according to an illustrative embodiment.

Referring to FIG. 1, and to the operational flow 300 in FIG. 3, data from the data collection and forecasting engine 120/320, including one or more of application and task data, log data, telecommunications network details, device configuration data and utilization data (e.g., the real-time system utilization states 682), is input to the data analytics and issue identification engine 130/330, which uses one or more machine learning models to identify device issues, recommend remedial actions and determine the root cause of the identified issues.

In one or more embodiments, based on a comparison of device performance data (e.g., BBU server performance data) performed by the device comparison layer 131, the device issue identification layer 132 determines at least one issue with at least one device of a plurality of devices, and a remedial action recommendation layer 133 identifies at least one remedial action to be performed to address the at least one issue. Issues may comprise, for example, reductions in performance that may exceed certain thresholds, such as, for example, reductions in throughput, bandwidth, IOPs, and processing speed, and increases in latency. The identifying is performed using one or more machine learning techniques and the at least one remedial action comprises adding at least one additional device to the plurality of devices (e.g., an additional server 261, which may replace a problematic BBU server or be added to augment an existing BBU server pool 260) and/or reconfiguring the at least one device (e.g., a server 261). The one or more machine learning techniques comprise a decision tree model comprising a plurality of decision trees respectively corresponding to the respective ones of the plurality of devices, and wherein identifying the at least one remedial action comprises using the decision tree model to correlate performance data of the plurality of devices. In illustrative embodiments, the decision tree model comprises a Random Forest model.

For example, the data analytics and issue identification engine 130/330 uses a Random Forest algorithm to analyze the real-time system utilization states 682, which may include metrics for server speed and performance. In one or more embodiments, the Random Forest machine learning algorithm correlates server statistics based on the user requests a server can process on a timely basis, relative to the number of servers in a BBU server pool 260 or server group 160. The output of the analysis by the Random Forest algorithm recommends corrective action such as, but not necessarily limited to, activating a new BBU or server (e.g., BBU server), and/or modifying configuration settings of existing servers (e.g., BBU servers) and/or BBUs. The modifications include, for example, adding a processing unit to handle incoming requests to maintain specific levels of functioning of servers (e.g., servers 261) in a pool (e.g., BBU server pool 260 or server group 160).

In a non-limiting illustrative example, BBU server performance may be affected, for example, when there are server hardware issues and/or there is an increase in the number of users causing increased load. The device comparison layer 131 and device issue identification layer 132 actively correlate performance (e.g., throughput, bandwidth, processing speed, etc.) of connected BBU servers in a BBU server pool and continuously monitor server performance. In a non-limiting illustrative example, if BBU server 'x' is capable of handling 20,000 requests and BBU server 'y' has performance degradation and is failing to handle incoming requests, the device comparison layer 131 and device issue identification layer 132 will correlate the servers' performance and their configuration settings in the BBU server pool and the remedial action recommendation layer 133 may recommend utilizing BBU server 'x' in place of BBU server 'y' to retain processing capability and maintain throughput.

Referring again to FIG. 6, telecommunications infrastructure data from the data collection and forecasting engine 120/320 including, including one or more of application and task data, log data, telecommunications network details, device configuration data and utilization data (e.g., the real-time system utilization states 682), is input to the data analytics and issue identification engine 630 and applied to one or more regression models to analyze the telecommunications infrastructure data to identify one or more issues (e.g., critical event 684) on one or more servers. According to an embodiment, the regression model comprises a Random Forest decision tree model including decision trees 662-1, 662-2, . . . , 662-N (collectively "decision trees 662") which are generated and correspond to the BBU servers 661-1, 661-2, . . . 661-N, respectively of a BBU server pool 660. The darkened oval in the decision tree 662-2 indicates an identified issue with the BBU server 661-2.

Based on the identified critical event 684, the remedial action recommendation layer 133 and the root cause and troubleshooting layer 135 perform random forest/decision tree analysis 690 to determine one or more remedial actions to address and remedy the identified issues with the one or more BBU servers 661 and identify one or more root causes of the issues (remedial action and root cause 691). According to an embodiment, the model comprises a Random Forest decision tree model including decision trees 663-1, 663-2, . . . , 663-N (collectively "decision trees 663") which are generated and correspond to the BBU servers 661-1, 661-2, . . . 661-N, respectively of a BBU server pool 660. The lack of a darkened oval indicates a state of the BBU servers 661 where the identified issue has been resolved. In an illustrative embodiment, a virtual machine 687 is generated which applies an ensemble method of machine learning to identify a previously loaded configuration of a BBU server (e.g., BBU server 661-2 that is being replaced), access the previous configuration and automatically deploy the configuration to bring the replacement server into production. If an administrator chooses not to load the previous configuration, the replacement server can be manually configured. Referring to FIG. 3, user preferences 302 may be designated by a user regarding whether certain new configurations are implemented or maintained, whether certain modifications should be ignored and the conditions under which configuration changes are instituted. The VM 687 includes metadata for the configurations of each of the BBU servers 661, including, for example, device identifiers, network protocols and types, number of CPUs, random-access memory (RAM) capacity, storage capacity, etc. FIG. 9 depicts example pseudocode 900 for using a Random Forest machine learning algorithm to analyze forecasted and real-time data.

Figure 7:
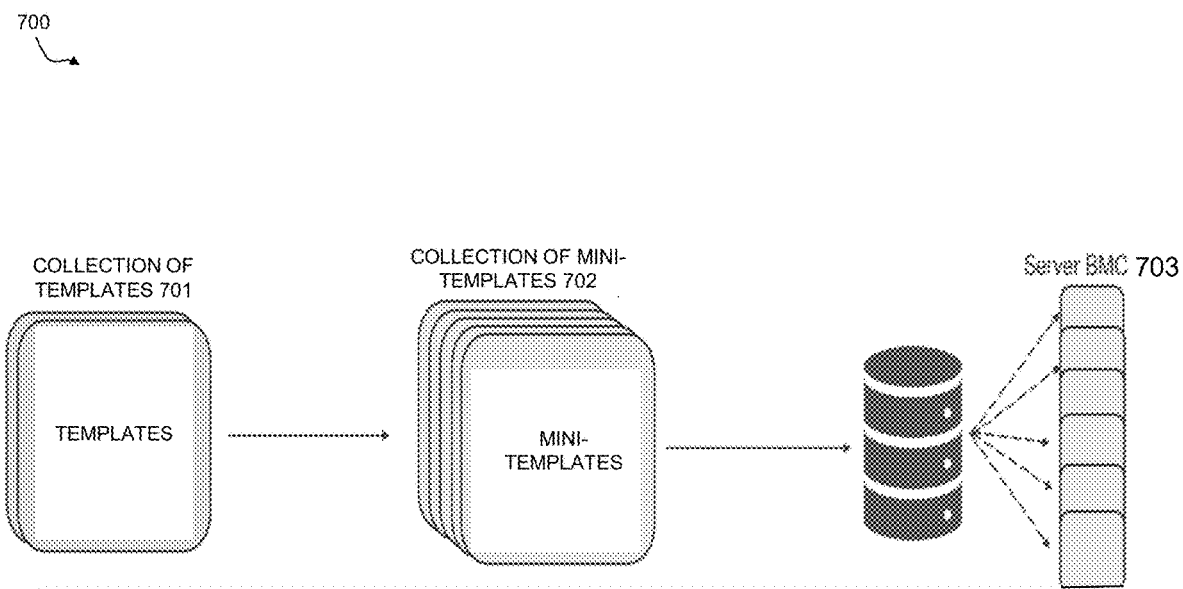
FIG. 7 depicts an operational flow for lightweight template generation according to an illustrative embodiment.

Referring to FIGS. 1, 3 and 7, one or more templates comprising the server configurations are generated by the template generation layer 134 of the data analytics and issue identification engine 130 in order to facilitate reconfiguration of existing servers or the addition of new or replacement servers to remedy one or more issues.

For example, at the server BMC level, lightweight profiles including lightweight workflow templates (e.g., lightweight workflow templates 334 in FIG. 3), are maintained and created by the template generation layer 134 based on the output of a knowledge lake 150/350. The knowledge lake 150/350 includes test and training datasets available from historical telecommunications infrastructure data, and may further include real-time telecommunications infrastructure data. The historical data may be sourced from BBUs from different telecommunications environments. As can be seen in FIG. 3, the knowledge lake 350 includes telecommunications network vendor information 351, configurations for multiple (N) BBU servers (BBU server-N configurations 352) and details of workflows and tasks 353 that have been and/or are currently being performed by one or more BBU servers.

The template generation layer 134 creates the lightweight profiles of different BBUs for use in executing remedial actions and decision making. The profiles on the server BMC level facilitate the application of corrective actions relating to, for example, configuration, alerts, and server level decision making. Using this methodology, a server BMC can simply maintain metadata corresponding to remedial actions and need not maintain the data and processes corresponding to the remedial actions.

In more detail, referring to the operational flow 700 of how server configurations may be generated using mini-templates in FIG. 7, configuration and BBU data statistics templates, which are generated as part of outputs of the data analytics and issue identification engine 130, are collected (collection of templates 701) at a centralized location that may be external to server BMCs. The collected templates are divided into smaller templates (e.g., mini-templates). The mini-templates are lightweight versions of the templates, omitting superfluous information or details that may not be necessary to the configuration or reconfiguration of BBU servers as described herein. The mini-templates are generated by the template generation layer 134 and collected (e.g., collection of mini-templates 702) at a centralized location that may be external to server BMCs (e.g., VM 687). A telecommunications mini template may have multiple sections such as, for example, performance, throughput, vendor, number of users, BBU configuration, endpoint details, etc. The generation of the mini-templates is based on the designated sections. Depending on the recommended remedial actions, certain mini-templates are loaded to particular server BMCs 703 based on which BBU servers require activation, replacement and/or reconfiguration.

Each telecommunications workflow may be a combination of, for example, 'n' different components. For some new BBU server configurations for the same vendor, only a few elements of server configuration (e.g., number of CPUs, amount of RAM, amount of storage, etc.), might change. Mini-templates facilitate the configuration changes and reduce the time to generate the new BBU server configurations.

A mini template comprises structured reference data that facilitates sorting and identification of attributes of the information each template describes. The following is a sample output of a mini-template in a JavaScript object notation (JSON) file format.

```
{
"File size" : 1KB
"type" : txt
```

```
"vendor information": JIO
"No of telecom users": 1000
"BBU ID": XYZ123
"Network" : CRAN
"Server configuration" : 2 CPU, 1TB RAM, 10TB storage
}
```

In illustrative embodiments, the lightweight templates identify one or more file sizes associated with at least one device, one or more file types associated with the at least one device, vendor information for at least one telecommunications network, a number of users of the at least one telecommunications network, a BBU identifier associated with the at least one device, a type of the at least one telecommunications network, a number of central processing units for the at least one device, an amount of RAM for the at least one device and a storage capacity of the at least one device.

Figure 10:
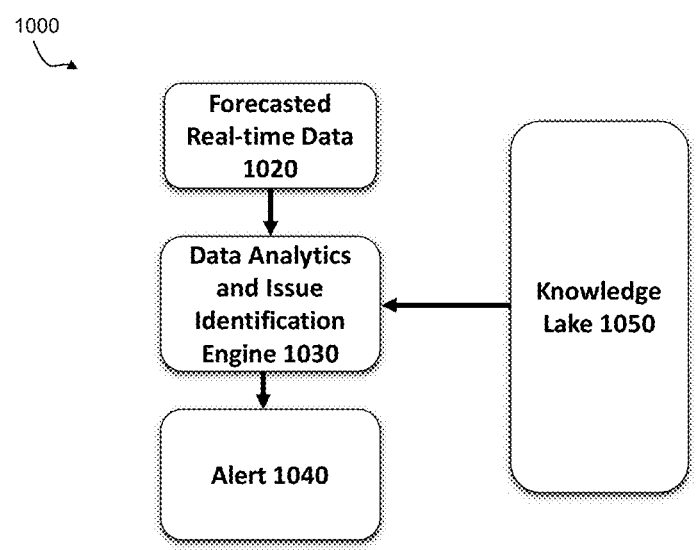
FIG. 10 depicts an operational flow for generating alerts, according to an illustrative embodiment.

Referring to the operational flow 1000 for generating administrator alerts in FIG. 10, the knowledge lake 1050, which is the same or similar to the knowledge lakes 150/350, comprises a data store that stores historical data of BBU server performance (e.g., throughput, bandwidth, processing speed, etc.). The forecasted real-time data 1020 obtained from the time series analysis by the data collection and forecasting engine 120 is divided into training and test datasets. In the forecasted real-time data, if there are any irregularities in BBU server performance, the data analytics and issue identification engine 1030, which is the same or similar to the data analytics and issue identification engine 130, will intelligently recommend remedial actions. Once the data analytics and issue identification engine 1030 identifies that there is an issue with BBU server performance, the report generation layer 141 of the output engine 140 will generate an alert 1040 for a telecommunications administrator, which may be transmitted to one or more user devices 102 (see also FIG. 3 (generate and transmit alerts 340)). The alert can be in the form of a report identifying one or more issues with BBU servers, recommended remedial actions and/or recommended troubleshooting actions to take, as well as comprehensive insight into the root cause of the issues. Referring back to FIG. 6, in an embodiment, a report 685 may include real-time system utilization state data (e.g., 682), critical server events (e.g., 684) and remedial action and root cause details (e.g., 691).

According to one or more embodiments, the knowledge lake 150/350/1050 or any other databases or data stores used by the device management platform 110 to store, for example, data collected by the data collection and forecasting engine 120, generated templates, metadata, etc. can be configured according to a relational database management system (RDBMS) (e.g., PostgreSQL). Databases or data stores in some embodiments are implemented using one or more storage systems or devices associated with the device management platform 110. In some embodiments, one or more of the storage systems utilized to implement the databases or data stores comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as elements of the device management platform 110, the data collection and forecasting engine 120, data analytics and issue identification engine 130, output engine 140 and/or knowledge lake 150 in other embodiments can be implemented at least in part externally to the device management platform 110, for example, as stand-alone servers, sets of servers or other types of systems coupled to the network 104. For example, the data collection and forecasting engine 120, data analytics and issue identification engine 130, output engine 140 and/or knowledge lake 150 may be provided as cloud services accessible by the device management platform 110.

The data collection and forecasting engine 120, data analytics and issue identification engine 130, output engine 140 and/or knowledge lake 150 in the FIG. 1 embodiment are each assumed to be implemented using at least one processing device. Each such processing device generally comprises at least one processor and an associated memory, and implements one or more functional modules for controlling certain features of the data collection and forecasting engine 120, data analytics and issue identification engine 130, output engine 140 and/or knowledge lake 150.

At least portions of the device management platform 110 and the components thereof may be implemented at least in part in the form of software that is stored in memory and executed by a processor. The device management platform 110 and the components thereof comprise further hardware and software required for running the device management platform 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the data collection and forecasting engine 120, data analytics and issue identification engine 130, output engine 140, knowledge lake 150 and other components of the device management platform 110 in the present embodiment are shown as part of the device management platform 110, at least a portion of the data collection and forecasting engine 120, data analytics and issue identification engine 130, output engine 140, knowledge lake 150 and other components of the device management platform 110 in other embodiments may be implemented on one or more other processing platforms that are accessible to the device management platform 110 over one or more networks. Such components can each be implemented at least in part within another system element or at least in part utilizing one or more stand-alone components coupled to the network 104.

It is assumed that the device management platform 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the data collection and forecasting engine 120, data analytics and issue identification engine 130, output engine 140, knowledge lake 150 and other components of the device management platform 110, and the elements thereof can each be implemented in the form of one or more LXCs running on one or more VMs. Other arrangements of one or more processing devices of a processing platform can be used to implement the data collection and forecasting engine 120, data analytics and issue identification engine 130, output engine 140 and knowledge lake 150, as well as other components of the device management platform 110. Other portions of the system 100 can similarly be implemented using one or more processing devices of at least one processing platform.

Distributed implementations of the system 100 are possible, in which certain components of the system reside in one datacenter in a first geographic location while other components of the system reside in one or more other data centers in one or more other geographic locations that are potentially remote from the first geographic location. Thus, it is possible in some implementations of the system 100 for different portions of the device management platform 110 to reside in different data centers. Numerous other distributed implementations of the device management platform 110 are possible.

Accordingly, one or each of the data collection and forecasting engine 120, data analytics and issue identification engine 130, output engine 140, knowledge lake 150 and other components of the device management platform 110 can each be implemented in a distributed manner so as to comprise a plurality of distributed components implemented on respective ones of a plurality of compute nodes of the device management platform 110.

It is to be appreciated that these and other features of illustrative embodiments are presented by way of example only, and should not be construed as limiting in any way.

Accordingly, different numbers, types and arrangements of system components such as the data collection and forecasting engine 120, data analytics and issue identification engine 130, output engine 140, knowledge lake 150 and other components of the device management platform 110, and the elements thereof can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, as indicated previously, in some illustrative embodiments, functionality for the device management platform can be offered to cloud infrastructure customers or other users as part of FaaS, CaaS and/or PaaS offerings.

Figure 11:
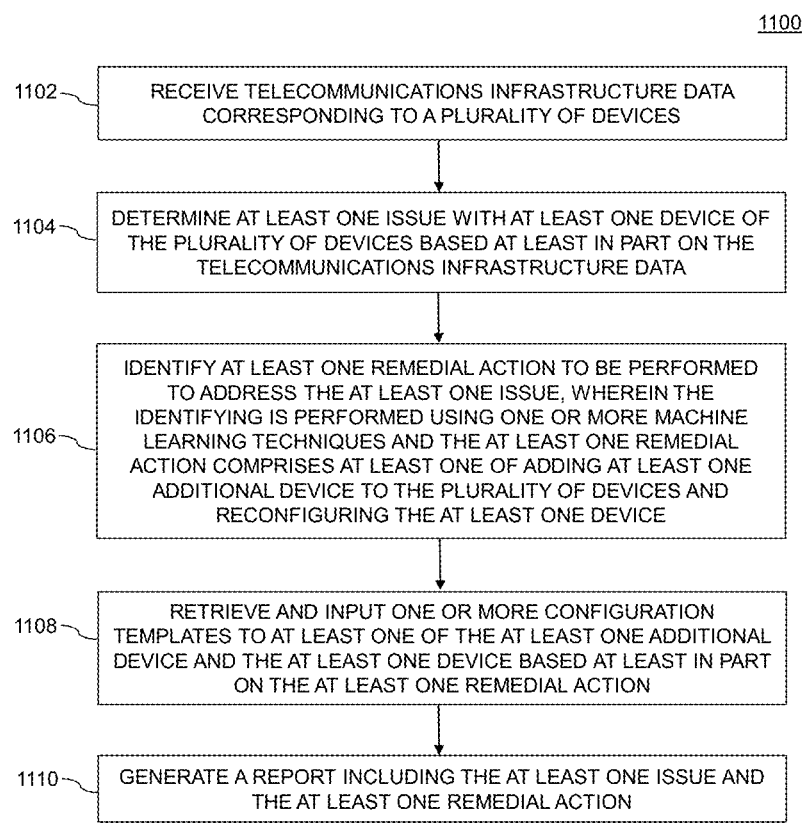
FIG. 11 depicts a process for managing telecommunications infrastructure devices according to an illustrative embodiment.

The operation of the information processing system 100 will now be described in further detail with reference to the flow diagram of FIG. 11. With reference to FIG. 11, a process 1100 for managing telecommunications infrastructure devices as shown includes steps 1102 through 1110, and is suitable for use in the system 100 but is more generally applicable to other types of information processing systems comprising a device management platform configured for managing telecommunications infrastructure devices.

In step 1102, telecommunications infrastructure data corresponding to a plurality of devices is received. The telecommunications infrastructure data comprises at least one of vendor information for at least one telecommunications network, a number of users of the at least one telecommunications network, a service radius of the at least one telecommunications network, baseband processing unit identifiers, one or more protocols of the at least one telecommunications network, one or more types of the at least one telecommunications network, operating system information for the plurality of devices, and disk information for the plurality of devices. The telecommunications infrastructure data may also comprise one or more performance parameters of the plurality of devices, the one or more performance parameters comprising at least one of throughput, bandwidth and processing speed.

In step 1104, at least one issue with at least one device of the plurality of devices is determined based at least in part on the telecommunications infrastructure data. Respective ones of the plurality of devices may comprise respective baseband unit servers of at least one pool of baseband unit servers.

In step 1106, at least one remedial action to be performed to address the at least one issue is identified. The identifying is performed using one or more machine learning techniques and the at least one remedial action comprises at least one of adding at least one additional device to the plurality of devices and reconfiguring the at least one device. The one or more machine learning techniques comprise, for example, a decision tree model comprising a plurality of decision trees respectively corresponding to the respective ones of the plurality of devices, wherein identifying the at least one remedial action comprises using the decision tree model to correlate performance data of the plurality of devices. The decision tree model comprises a Random Forest model.

In step 1108, one or more configuration templates are retrieved and inputted to at least one of the at least one additional device and the at least one device based at least in part on the at least one remedial action. The one or more configuration templates are input to a BMC of at least one of the at least one additional device and the at least one device. The one or more configuration templates identify at least one of one or more file sizes associated with the at least one device, one or more file types associated with the at least one device, vendor information for at least one telecommunications network, a number of users of the at least one telecommunications network, a baseband processing unit identifier associated with the at least one device, a type of the at least one telecommunications network, a number of central processing units for the at least one device, an amount of random-access memory for the at least one device and a storage capacity of the at least one device. In step 1110, a report including the at least one issue and the at least one remedial action is generated. The one or more machine learning techniques may be used to determine one or more causes of the at least one issue, and the one or more causes of the at least one issue can be included in the report.

In illustrative embodiments, the telecommunications infrastructure data is processed using a time series machine learning model to determine real-time performance states of respective ones of the plurality of devices. The time series machine learning model comprises an ARIMA time series machine learning model. The real-time performance states identify at least one of CPU utilization, memory utilization, network utilization and storage utilization of the plurality of devices.

In illustrative embodiments, configurations of the one or more configuration templates are deployed on at least one of the at least one additional device and the at least one device, and one or more workloads are activated on at least one of the at least one additional device and the at least one device following the deploying.

It is to be appreciated that the FIG. 11 process and other features and functionality described above can be adapted for use with other types of information systems configured to execute device management services in a device management platform or other type of platform.

The particular processing operations and other system functionality described in conjunction with the flow diagram of FIG. 11 are therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 11 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with a device management platform as disclosed herein can provide a number of significant advantages relative to conventional arrangements. For example, unlike conventional techniques, the embodiments advantageously use machine learning techniques to automate remedial actions and reconfiguration of devices in, for example, a telecommunications infrastructure when faced with device issues and/or failures. Current approaches lack the ability at a server level to dynamically manage, configure and take corrective actions in a telecommunications infrastructure once a server is placed in a BBU of a C-RAN. In an effort to address these deficiencies, the embodiments provide functionality for creating and using configuration templates to automatically configure and manage a telecommunications network when BBU servers are plugged in to a C-RAN.

The embodiments provide technical solutions which collect the telecommunications infrastructure information in BMCs using a passthrough channel applicable to multiple telecommunications use cases, infrastructure planning and ensuring throughput and efficiency in a C-RAN.

Conventional techniques fail to dynamically analyze telecommunications infrastructures and suggest corrective actions to telecommunications administrators based on real-time needs for increased throughput. Advantageously, the embodiments use time series and decision tree techniques to automatically identify device issues, recommend remedial actions and identify root cause and troubleshooting techniques for the issues.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors.

Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system components such as the device management platform 110 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and a device management platform in illustrative embodiments. These and other cloud-based systems in illustrative embodiments can include object stores.

Illustrative embodiments of processing platforms will now be described in greater detail with reference to FIGS. 12 and 13. Although described in the context of system 100, these platforms may also be used to implement at least portions of other information processing systems in other embodiments.

Figure 12:
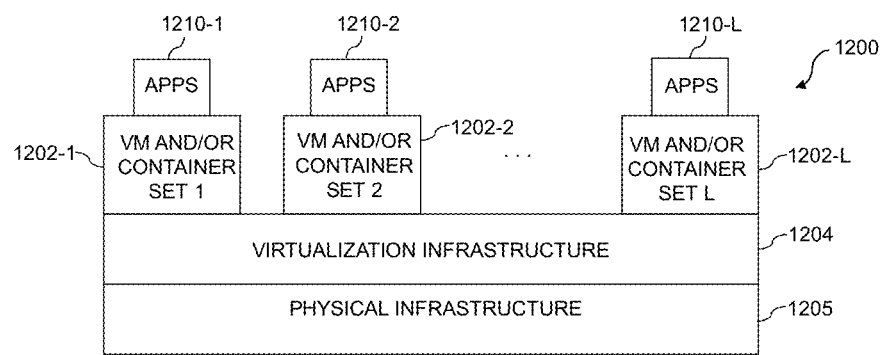
FIGS. 12 and 13 show examples of processing platforms that may be utilized to implement at least a portion of an information processing system in illustrative embodiments.
Figure 13:
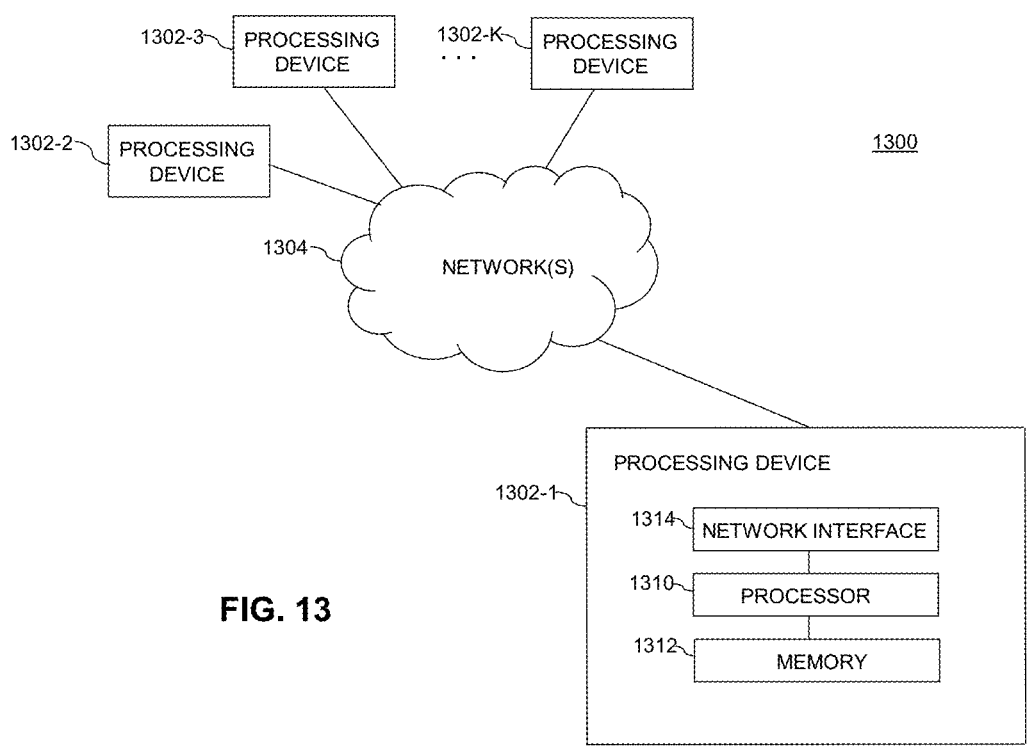

FIG. 12 shows an example processing platform comprising cloud infrastructure 1200. The cloud infrastructure 1200 comprises a combination of physical and virtual processing resources that may be utilized to implement at least a portion of the information processing system 100. The cloud infrastructure 1200 comprises multiple virtual machines (VMs) and/or container sets 1202-1, 1202-2, . . . 1202-L implemented using virtualization infrastructure 1204. The virtualization infrastructure 1204 runs on physical infrastructure 1205, and illustratively comprises one or more hypervisors and/or operating system level virtualization infrastructure. The operating system level virtualization infrastructure illustratively comprises kernel control groups of a Linux operating system or other type of operating system.

The cloud infrastructure 1200 further comprises sets of applications 1210-1, 1210-2, . . . 1210-L running on respective ones of the VMs/container sets 1202-1, 1202-2, . . . 1202-L under the control of the virtualization infrastructure 1204. The VMs/container sets 1202 may comprise respective VMs, respective sets of one or more containers, or respective sets of one or more containers running in VMs.

In some implementations of the FIG. 12 embodiment, the VMs/container sets 1202 comprise respective VMs implemented using virtualization infrastructure 1204 that comprises at least one hypervisor. A hypervisor platform may be used to implement a hypervisor within the virtualization infrastructure 1204, where the hypervisor platform has an associated virtual infrastructure management system. The underlying physical machines may comprise one or more distributed processing platforms that include one or more storage systems.

In other implementations of the FIG. 12 embodiment, the VMs/container sets 1202 comprise respective containers implemented using virtualization infrastructure 1204 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1200 shown in FIG. 12 may represent at least a portion of one processing platform. Another example of such a processing platform is processing platform 1300 shown in FIG. 13.

The processing platform 1300 in this embodiment comprises a portion of system 100 and includes a plurality of processing devices, denoted 1302-1, 1302-2, 1302-3, . . . 1302-K, which communicate with one another over a network 1304.

The network 1304 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1302-1 in the processing platform 1300 comprises a processor 1310 coupled to a memory 1312. The processor 1310 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1312 may comprise random access memory (RAM), read-only memory (ROM), flash memory or other types of memory, in any combination. The memory 1312 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1302-1 is network interface circuitry 1314, which is used to interface the processing device with the network 1304 and other system components, and may comprise conventional transceivers.

The other processing devices 1302 of the processing platform 1300 are assumed to be configured in a manner similar to that shown for processing device 1302-1 in the figure.

Again, the particular processing platform 1300 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more components of the device management platform 110 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and device management platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
  receiving telecommunications infrastructure data corresponding to a plurality of devices;
  determining at least one issue with at least one device of the plurality of devices based at least in part on the telecommunications infrastructure data;
  identifying at least one remedial action to be performed to address the at least one issue, wherein the identifying is performed using one or more machine learning techniques and the at least one remedial action comprises at least one of adding at least one additional device to the plurality of devices and reconfiguring the at least one device;

generating a plurality of configuration templates, wherein generating the plurality of configuration templates comprises:
    generating a plurality of base templates; and
    removing one or more details from respective ones of the plurality of base templates to create the plurality of configuration templates;
retrieving and inputting one or more configuration templates of the plurality of configuration templates to at least one of the at least one additional device and the at least one device based at least in part on the at least one remedial action; and
generating a report including the at least one issue and the at least one remedial action;
wherein the steps of the method are executed by a processing device operatively coupled to a memory.

2. The method of claim 1, wherein the telecommunications infrastructure data comprises at least one of vendor information for at least one telecommunications network, a number of users of the at least one telecommunications network, a service radius of the at least one telecommunications network, baseband processing unit identifiers, one or more protocols of the at least one telecommunications network, one or more types of the at least one telecommunications network, operating system information for the plurality of devices, and disk information for the plurality of devices.

3. The method of claim 1, wherein the telecommunications infrastructure data comprises one or more performance parameters of the plurality of devices, the one or more performance parameters comprising at least one of throughput, bandwidth and processing speed.

4. The method of claim 1, wherein respective ones of the plurality of devices comprise respective baseband unit servers of at least one pool of baseband unit servers.

5. The method of claim 1, further comprising processing the telecommunications infrastructure data using a time series machine learning model to determine real-time performance states of respective ones of the plurality of devices.

6. The method of claim 5, wherein the time series machine learning model comprises an autoregressive integrated moving average time series machine learning model.

7. The method of claim 5, wherein the real-time performance states identify at least one of central processing unit utilization, memory utilization, network utilization and storage utilization of the plurality of devices.

8. The method of claim 1, wherein the one or more configuration templates are input to a baseboard management controller of at least one of the at least one additional device and the at least one device.

9. The method of claim 1, wherein the one or more configuration templates identify at least one of one or more file sizes associated with the at least one device, one or more file types associated with the at least one device, vendor information for at least one telecommunications network, a number of users of the at least one telecommunications network, a baseband processing unit identifier associated with the at least one device, a type of the at least one telecommunications network, a number of central processing units for the at least one device, an amount of random-access memory for the at least one device and a storage capacity of the at least one device.

10. The method of claim 1, wherein the one or more machine learning techniques comprise a decision tree model comprising a plurality of decision trees respectively corresponding to respective ones of the plurality of devices, and wherein identifying the at least one remedial action comprises using the decision tree model to correlate performance data of the plurality of devices.

11. The method of claim 10, wherein the decision tree model comprises a Random Forest model.

12. The method of claim 1, further comprising:
deploying configurations of the one or more configuration templates on at least one of the at least one additional device and the at least one device; and
activating one or more workloads on at least one of the at least one additional device and the at least one device following the deploying.

13. The method of claim 1, further comprising:
using the one or more machine learning techniques to determine one or more causes of the at least one issue; and
including the one or more causes of the at least one issue in the report.

14. An apparatus comprising:
a processing device operatively coupled to a memory and configured to:
receive telecommunications infrastructure data corresponding to a plurality of devices;
determine at least one issue with at least one device of the plurality of devices based at least in part on the telecommunications infrastructure data;
identify at least one remedial action to be performed to address the at least one issue, wherein the identifying is performed using one or more machine learning techniques and the at least one remedial action comprises at least one of adding at least one additional device to the plurality of devices and reconfiguring the at least one device;
generate a plurality of configuration templates, wherein generating the plurality of configuration templates comprises:
    generating a plurality of base templates; and
    removing one or more details from respective ones of the plurality of base templates to create the plurality of configuration templates;
retrieve and input one or more configuration templates of the plurality of configuration templates to at least one of the at least one additional device and the at least one device based at least in part on the at least one remedial action; and
generate a report including the at least one issue and the at least one remedial action.

15. The apparatus of claim 14, wherein the one or more machine learning techniques comprise a decision tree model comprising a plurality of decision trees respectively corresponding to respective ones of the plurality of devices, and wherein, in identifying the at least one remedial action, the processing device is configured to use the decision tree model to correlate performance data of the plurality of devices.

16. The apparatus of claim 14, wherein the processing device is further configured to:
deploy configurations of the one or more configuration templates on at least one of the at least one additional device and the at least one device; and
activate one or more workloads on at least one of the at least one additional device and the at least one device following the deploying.

17. The apparatus of claim 14, wherein the processing device is further configured to:

use the one or more machine learning techniques to determine one or more causes of the at least one issue; and include the one or more causes of the at least one issue in the report.

18. An article of manufacture comprising a non-transitory processor-readable storage medium having stored therein program code of one or more software programs, wherein the program code when executed by at least one processing device causes said at least one processing device to perform the steps of:

receiving telecommunications infrastructure data corresponding to a plurality of devices;

determining at least one issue with at least one device of the plurality of devices based at least in part on the telecommunications infrastructure data;

identifying at least one remedial action to be performed to address the at least one issue, wherein the identifying is performed using one or more machine learning techniques and the at least one remedial action comprises at least one of adding at least one additional device to the plurality of devices and reconfiguring the at least one device;

generating a plurality of configuration templates, wherein generating the plurality of configuration templates comprises:

generating a plurality of base templates; and removing one or more details from respective ones of the plurality of base templates to create the plurality of configuration templates;

retrieving and inputting one or more configuration templates of the plurality of configuration templates to at least one of the at least one additional device and the at least one device based at least in part on the at least one remedial action; and generating a report including the at least one issue and the at least one remedial action.

19. The article of manufacture of claim 18, wherein the one or more machine learning techniques comprise a decision tree model comprising a plurality of decision trees respectively corresponding to respective ones of the plurality of devices, and wherein, in identifying the at least one remedial action, the program code causes said at least one processing device to use the decision tree model to correlate performance data of the plurality of devices.

20. The article of manufacture of claim 18, wherein the program code further causes said at least one processing device to perform the steps of:

deploying configurations of the one or more configuration templates on at least one of the at least one additional device and the at least one device; and activating one or more workloads on at least one of the at least one additional device and the at least one device following the deploying.

* * * * *